(12) United States Patent
Sun et al.

(10) Patent No.: US 11,837,985 B2
(45) Date of Patent: Dec. 5, 2023

(54) MOTOR AND CONTROL METHOD THEREFORE

(71) Applicants: Robert Bosch GmbH, Stuttgart (DE); Alina Sun, Shanghai (CN); Tingting Dong, Shanghai (CN); Takashi Shigematsu, Shanghai (CN); Thomas Specker, Shanghai (CN)

(72) Inventors: Alina Sun, Shanghai (CN); Tingting Dong, Shanghai (CN); Takashi Shigematsu, Shanghai (CN); Thomas Specker, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 508 days.

(21) Appl. No.: 17/261,002

(22) PCT Filed: Jul. 19, 2018

(86) PCT No.: PCT/CN2018/096207
§ 371 (c)(1),
(2) Date: Jan. 16, 2021

(87) PCT Pub. No.: WO2020/014914
PCT Pub. Date: Jan. 23, 2020

(65) Prior Publication Data
US 2021/0297033 A1    Sep. 23, 2021

(51) Int. Cl.
*H02H 7/085* (2006.01)
*H02P 29/64* (2016.01)
(Continued)

(52) U.S. Cl.
CPC ............. *H02P 29/64* (2016.02); *B62M 7/12* (2013.01); *H02P 25/22* (2013.01)

(58) Field of Classification Search
CPC ........... H02P 29/64; H02P 25/22; B62M 7/12; H02H 7/085; H02K 11/33
See application file for complete search history.

(56) References Cited

U.S. PATENT DOCUMENTS 3,963,962 A    6/1976  Sutton
4,041,542 A *  8/1977  Pfarrer ................... H02H 7/085
                                                    318/471
(Continued)

FOREIGN PATENT DOCUMENTS

CN    201774393 U    3/2011
CN    102457119 A    5/2012
(Continued)

OTHER PUBLICATIONS

International Search Report corresponding to PCT Application No. PCT/CN2018/096207, dated Apr. 22, 2019 (Chinese and English language document) (5 pages).

*Primary Examiner* — Cortez M Cook
(74) *Attorney, Agent, or Firm* — Maginot, Moore & Beck LLP

(57) ABSTRACT

An N-phase electric machine, N being an integer ≥3, includes a housing; i×N stator windings arranged in a fixed manner in the housing, i being an integer ≥2; and a rotatable rotor surrounded by the i×N stator windings in the housing. The stator windings are consecutively divided into i subgroups in a circumferential direction, each subgroup having N stator windings. The electric machine further comprises i current control modules and i temperature measurement devices, each current control module being correspondingly electrically connected to the N stator windings in one corresponding subgroup, so that when the stator windings in the i subgroups are supplied with power by the i current control modules, a rotating magnetic field is generated around the rotor. Each temperature measurement device is configured to measure the temperature of one corresponding subgroup in the i subgroups during operation of the electric machine.

20 Claims, 5 Drawing Sheets

(51) Int. Cl.
*B62M 7/12* (2006.01)
*H02P 25/22* (2006.01)

(56) References Cited

U.S. PATENT DOCUMENTS

| | | | |
|---|---|---|---|
| 8,283,831 | B1 | 10/2012 | Kaminsky et al. |
| 9,337,707 | B2 * | 5/2016 | Dixon .................... H02K 11/33 |
| 2010/0156338 | A1 | 6/2010 | Lu et al. |

FOREIGN PATENT DOCUMENTS

| | | |
|---|---|---|
| CN | 102968143 A | 3/2013 |
| CN | 203039454 A | 7/2013 |
| CN | 103414161 A | 11/2013 |
| CN | 103490385 A | 1/2014 |
| CN | 104167842 A | 11/2014 |
| CN | 104682631 A | 6/2015 |
| CN | 105897115 A | 8/2016 |
| CN | 106330035 A | 1/2017 |
| CN | 107406003 A | 11/2017 |
| CN | 107546924 A | 1/2018 |
| EP | 2 962 926 A1 | 1/2016 |
| JP | 2000-316202 A | 11/2000 |
| JP | 2010-127834 A | 6/2010 |
| SU | 1417112 A1 | 8/1988 |
| TW | 201519572 A | 5/2015 |
| WO | 2011/015008 A1 | 2/2011 |

\* cited by examiner

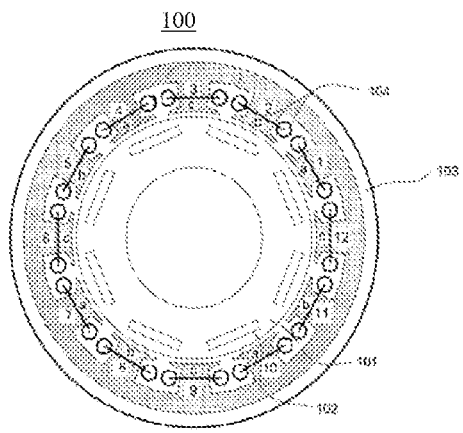
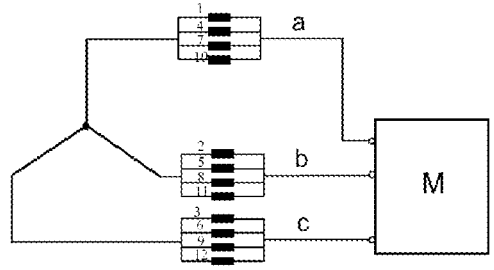
Fig. 2A
PRIOR ART
Fig. 2B
PRIOR ART
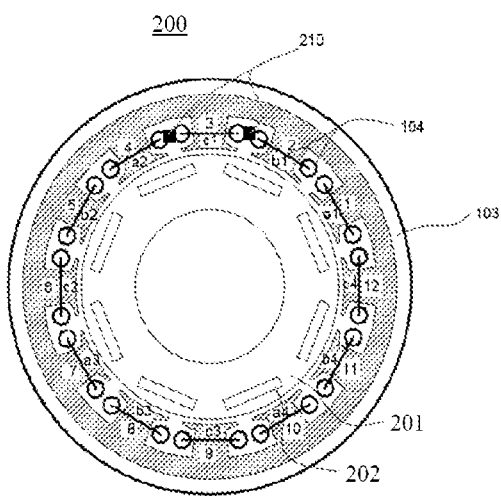
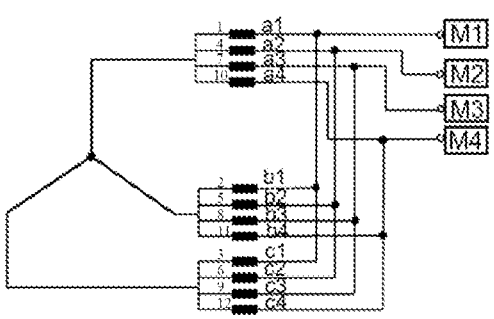
Fig. 3A
Fig. 3B

MOTOR AND CONTROL METHOD THEREFORE

This application is a 35 U.S.C. § 371 National Stage Application of PCT/CN2018/096207, filed on Jul. 19, 2018, the disclosure of which is incorporated herein by reference in its entirety.

The present application relates generally to an electric machine, in particular a permanent magnet synchronous electric machine, and a method for control during operation of the electric machine.

BACKGROUND

As environmental protection regulation requirements become ever more stringent, and in order to protect the environment, the development and use of electric vehicles is becoming ever more widespread. Taking electric motorcycles as an example, an electric machine such as a permanent magnet synchronous electric machine, and a gear transmission integrated with the electric machine, will generally be mounted on a wheel axle of an electric motorcycle, for driving the wheel to rotate.

Generally, the electric machine comprises a housing, stator windings arranged in the housing in a fixed manner, and a rotatable rotor surrounded by the stator windings in the housing. Since the stator windings are arranged at a certain phase angle such as 120 degrees, a rotating magnetic field is generated in the stator windings when currents of corresponding phases are inputted to the stator windings. The rotor is rotated relative to the housing under the action of the rotating magnetic field. The stator windings are essentially formed of metal wires (e.g. copper wires or aluminium wires). Thus, when currents flow through the stator windings, heat will be generated. As the period of operation continues, the heat that is generated is transmitted to the outside through the housing.

Restricted by the particular vehicle frame structure, it is not possible for air to flow uniformly through the entire housing of the electric machine when the electric motorcycle is travelling. This results in uneven dissipation of heat on the housing. When the electric motorcycle has been travelling for a long period of time, if the heat generated by the stator windings is excessive and cannot be dissipated quickly, the operating efficiency and output power of the electric machine will be affected.

SUMMARY

In response to the above problem, the aim of the present application is to propose a method for an electric machine, in particular a permanent magnet synchronous electric machine, and an electric machine implemented using the method, so as to be able to effectively control the release of heat from stator windings of the electric machine.

According to one aspect of the present application, an N-phase electric machine, in particular an N-phase permanent magnet synchronous electric machine, is provided, wherein N is an integer ≥3, the electric machine comprising:
a housing;
i×N stator windings arranged in a fixed manner in the housing, wherein i is an integer ≥2; and
a rotatable rotor surrounded by the i×N stator windings in the housing, wherein the stator windings are consecutively divided into i subgroups in a circumferential direction, each subgroup having N stator windings, and the electric machine further comprises i current control modules and i temperature measurement devices, each current control module being correspondingly electrically connected to the N stator windings in one corresponding subgroup, so that when the stator windings in the i subgroups are supplied with power by means of the i current control modules, a rotating magnetic field is generated around the rotor, and each temperature measurement device is used for measuring the temperature of one corresponding subgroup in the i subgroups during operation of the electric machine; and based on a temperature measurement value of the corresponding subgroup, each current control module independently controls a power supply amplitude of the stator windings in said subgroup during operation of the electric machine.

Optionally, each temperature measurement device comprises one or more temperature sensors disposed in the housing.

Optionally, the temperature sensor is disposed at an axial end of the stator winding.

Optionally, when the temperature measurement value of one subgroup is higher than a first preset value, the power supply amplitude of the stator windings in the subgroup is reduced by means of the corresponding current control module; and/or when the temperature measurement value of one subgroup is lower than a second preset value, the power supply amplitude of the stator windings in the subgroup is increased by means of the corresponding current control module.

Optionally, each temperature measurement device comprises N temperature sensors, to measure the temperature of each stator winding in the corresponding subgroup.

Optionally, the first preset value is equal to or greater than the second preset value.

According to another aspect of the present application, further provided is an N-phase electric machine, in particular an N-phase permanent magnet synchronous electric machine, wherein N is an integer 3, the electric machine comprising:
a housing;
K stator winding segments arranged in a fixed manner in an axial direction in the housing, wherein K is an integer ≥2;
a rotatable rotor surrounded by the K stator winding segments in the housing, each stator winding segment comprising multiple stator windings, the electric machine further comprising K temperature measurement devices, each temperature measurement device being used for measuring the temperature of one corresponding stator winding segment in the K stator winding segments during operation of the electric machine, wherein a power supply amplitude of the stator windings in each stator winding segment is independently set according to a temperature measurement value of said stator winding segment during operation of the electric machine.

Optionally, each stator winding segment comprises the same number of multiple stator windings, and the stator windings of the stator winding segments are respectively aligned with each other in the axial direction.

Optionally, a current control module is provided for each stator winding segment, and when the temperature measurement value of one stator winding segment is higher than a first preset value, the power supply amplitude of the stator windings in the stator winding segment is reduced by means of the corresponding current control module; and/or when the temperature measurement value of one stator winding segment is lower than a second preset value, the power supply amplitude of the stator windings in the stator winding segment is increased by means of the corresponding current control module.

Optionally, each temperature measurement device comprises one or more temperature sensors disposed in the housing.

Optionally, the temperature sensor is disposed at an axial end of the stator winding.

Optionally, the first preset value is equal to or greater than the second preset value.

According to another aspect of the present application, further provided is an N-phase electric machine, in particular an N-phase permanent magnet synchronous electric machine, wherein N is an integer 3, the electric machine comprising:
- a housing;
- K stator winding segments arranged in a fixed manner in an axial direction in the housing, wherein K is an integer ≥2;
- at least one of the K stator winding segments comprises i×N stator windings, so that the stator windings are consecutively divided into i subgroups in a circumferential direction, each subgroup having N stator windings, wherein i is an integer ≥2; furthermore, i current control modules and i temperature measurement devices are provided for the at least one stator winding segment, each current control module being correspondingly electrically connected to the N stator windings in one corresponding subgroup, so that when the stator windings in the i subgroups are supplied with power by means of the i current control modules, a rotating magnetic field is generated around the rotor, and each temperature measurement device is used for measuring the temperature of one corresponding subgroup in the i subgroups during operation of the electric machine; and based on a temperature measurement value of the corresponding subgroup, each current control module independently controls a power supply amplitude of the stator windings in said subgroup during operation of the electric machine.

Optionally, each temperature measurement device comprises one or more temperature sensors disposed in the housing.

Optionally, the temperature sensor is disposed at an axial end of the stator winding.

Optionally, when the temperature measurement value of one subgroup is higher than a first preset value, the power supply amplitude of the stator windings in the subgroup is reduced by means of the corresponding current control module; and/or when the temperature measurement value of one subgroup is lower than a second preset value, the power supply amplitude of the stator windings in the subgroup is increased by means of the corresponding current control module.

Optionally, each temperature measurement device comprises N temperature sensors, to measure the temperature of each stator winding in the corresponding subgroup.

Optionally, the first preset value is equal to or greater than the second preset value.

According to another aspect of the present application, further provided is a method for controlling an N-phase electric machine, in particular an N-phase permanent magnet synchronous electric machine, wherein N is an integer ≥3, the electric machine comprising i×N stator windings, wherein i is an integer ≥2, the method comprising:

consecutively dividing the stator windings into i subgroups in a circumferential direction, each subgroup having N stator windings;

providing i current control modules and i temperature measurement devices for the electric machine, each current control module being correspondingly electrically connected to the N stator windings in one corresponding subgroup, so that when the stator windings in the i subgroups are supplied with power by means of the i current control modules, a rotating magnetic field is generated around a rotor of the electric machine, and each temperature measurement device is used for measuring the temperature of one corresponding subgroup in the i subgroups during operation of the electric machine; and based on a temperature measurement value of each subgroup, independently controlling a power supply amplitude of the stator windings in said subgroup by means of the corresponding current control module during operation of the electric machine.

Optionally, each temperature measurement device comprises one or more temperature sensors disposed in the housing.

Optionally, the temperature sensor is disposed at an axial end of the stator winding.

Optionally, when the temperature measurement value of one subgroup is higher than a first preset value, the power supply amplitude of the stator windings in the subgroup is reduced by means of the corresponding current control module; and/or when the temperature measurement value of one subgroup is lower than a second preset value, the power supply amplitude of the stator windings in the subgroup is increased by means of the corresponding current control module.

Optionally, each temperature measurement device comprises N temperature sensors, to measure the temperature of each stator winding in the corresponding subgroup.

Optionally, the first preset value is equal to or greater than the second preset value.

According to another aspect of the present application, further provided is a method for controlling an N-phase electric machine, in particular an N-phase permanent magnet synchronous electric machine, wherein N is an integer ≥3, the electric machine comprising K stator winding segments arranged in a fixed manner in an axial direction, wherein K is an integer ≥2, each stator winding segment comprising multiple stator windings, the method comprising:

providing K temperature measurement devices for the electric machine, each temperature measurement device being used for measuring the temperature of one corresponding stator winding segment in the K stator winding segments during operation of the electric machine; and based on a temperature measurement value of each stator winding segment, independently determining a power supply amplitude of the stator windings in said stator winding segment during operation of the electric machine.

Optionally, each stator winding segment comprises the same number of multiple stator windings, and the stator windings of the stator winding segments are respectively aligned with each other in the axial direction.

Optionally, a current control module is provided for each stator winding segment, and when the temperature measurement value of one stator winding segment is higher than a first preset value, the power supply amplitude of the stator windings in the stator winding segment is reduced by means of the corresponding current control module; and/or when the temperature measurement value of one stator winding segment is lower than a second preset value, the power supply amplitude of the stator windings in the stator winding segment is increased by means of the corresponding current control module.

Optionally, each temperature measurement device comprises one or more temperature sensors disposed in the housing.

Optionally, the temperature sensor is disposed at an axial end of the stator winding.

Optionally, the first preset value is equal to or greater than the second preset value.

According to another aspect of the present application, further provided is a method for controlling an N-phase electric machine, in particular an N-phase permanent magnet synchronous electric machine, wherein N is an integer ≥3, the electric machine comprising K stator winding segments arranged in a fixed manner in an axial direction, wherein K is an integer ≥2, each stator winding segment comprising multiple stator windings, the method comprising:

letting at least one of the K stator winding segments have i×N stator windings, wherein i is an integer ≥2;

consecutively dividing the i×N stator windings of the at least one stator winding segment into i subgroups in a circumferential direction, each subgroup having N stator windings;

providing i current control modules and i temperature measurement devices for the at least one stator winding segment, each current control module being correspondingly electrically connected to the N stator windings in one corresponding subgroup, so that when the stator windings in the i subgroups are supplied with power by means of the i current control modules, a rotating magnetic field is generated around a rotor of the electric machine, and each temperature measurement device is used for measuring the temperature of one corresponding subgroup in the i subgroups during operation of the electric machine; and based on a temperature measurement value of each subgroup, independently controlling a power supply amplitude of the stator windings in said subgroup by means of the corresponding current control module during operation of the electric machine.

Optionally, each temperature measurement device comprises one or more temperature sensors disposed in the housing.

Optionally, the temperature sensor is disposed at an axial end of the stator winding.

Optionally, when the temperature measurement value of one subgroup is higher than a first preset value, the power supply amplitude of the stator windings in the subgroup is reduced by means of the corresponding current control module; and/or when the temperature measurement value of one subgroup is lower than a second preset value, the power supply amplitude of the stator windings in the subgroup is increased by means of the corresponding current control module.

Optionally, each temperature measurement device comprises N temperature sensors, to measure the temperature of each stator winding in the corresponding subgroup.

Optionally, the first preset value is equal to or greater than the second preset value.

According to another aspect of the present application, further provided is an electric vehicle, in particular an electric motorcycle, comprising the N-phase electric machine as described above.

Using the technical approach of the present application, it is substantially possible to eliminate the problem caused by heat dissipation being uneven in the circumferential and/or axial direction during operation of the electric machine, without any significant drop in the electric machine's operating efficiency and output power.

BRIEF DESCRIPTION OF THE DRAWINGS

A more comprehensive understanding of the abovementioned and other aspects of the present application will be gained from the following detailed explanation in conjunction with the following drawings. It must be pointed out that the scales of the drawings might be different in order to provide a clear explanation, but this will not affect understanding of the present application. In the drawings:

FIGS. 2A and 2B show schematically a manner of arrangement of stator windings of an electric machine according to the prior art.

FIGS. 3A and 3B show schematically a manner of arrangement of stator windings of an electric machine according to an embodiment of the present application.

DETAILED DESCRIPTION

Figure 1:
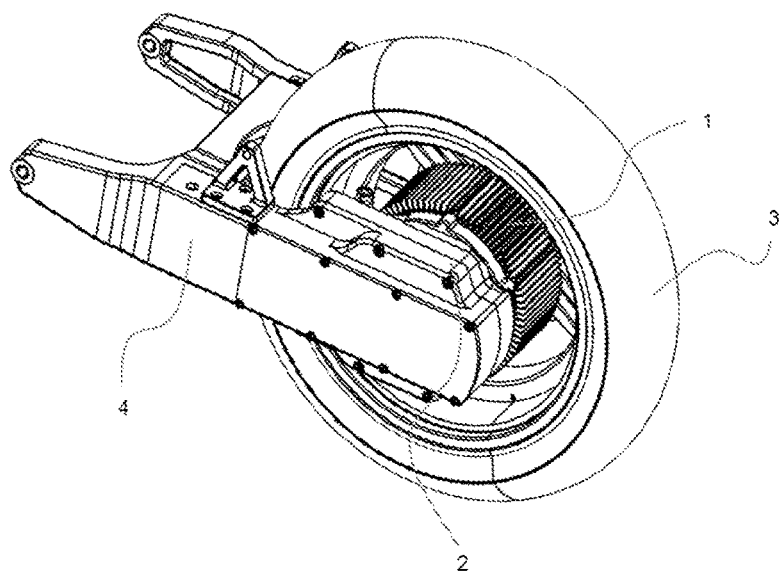
FIG. 1 shows schematically a three-dimensional drawing of a part of an electric motorcycle fitted with an electric machine.

In the drawings of the present application, structurally identical or functionally similar features are indicated by identical reference labels.

FIG. 1 shows schematically a three-dimensional drawing of a part of an electric motorcycle. An electric machine 1 such as a permanent magnet synchronous electric machine is mounted on the electric motorcycle; the electric machine 1 is connected to a wheel axle of the electric motorcycle via an integrated speed reducer 2 such as a gear speed reducer, and is thereby able to drive a wheel 3 of the electric motorcycle to rotate. Due to the blocking action of a vehicle frame 4 of the electric motorcycle, when the electric motorcycle is travelling, an airflow coming from the front of the vehicle cannot flow uniformly over a surface of the electric machine 1, and consequently, internal heat thereof cannot be released to the outside uniformly.

For this reason, the content of the present application that is described below solves the problem of internal heat of the electric machine being unable to be released uniformly, and will not reduce the output power of the electric machine. Those skilled in the art will understand that although the content described below is directed at electric motorcycles, the same technology can be applied to other electric vehicles such as electric cars. In addition, the electric machine in the description or claims of the present application is not limited to a permanent magnet synchronous electric machine; other electric machines such as AC asynchronous electric machines can likewise employ the technical approach mentioned in the present application.

The electric machine in the present application substantially comprises a housing, a stator core/iron core mounted in a fixed manner in the housing, stator windings wound on the stator core, and a rotor which is rotatably mounted in the housing and surrounded by the stator windings. Multiple permanent magnets are arranged uniformly on the rotor in a circumferential direction.

For schematic purposes, FIGS. 2A and 2B illustrate electric machine technology in the prior art, taking a three-phase permanent magnet synchronous electric machine 100 as an example. Stator windings of this type of prior-art electric machine 100 are arranged in the manner shown in FIG. 2A: in the circumferential direction, 12 stator windings 1, 2, 3, 4, 5, 6, 7, 8, 9, 10, 11 and 12, each being metal wires, are wound at uniform intervals on the stator core (not shown). For example, the stator core may be formed by laminating multiple layers of silicon steel plates to form multiple grooves. The stator windings are formed by winding metal wires in each of the grooves. Two adjacent stator windings are spaced apart by a circumferential angle of 30 degrees. In addition, the electric machine 100 further comprises a rotor 101, having eight permanent magnets 102 arranged thereon at uniform intervals in the circumferential direction. According to FIG. 2B, stator windings 1, 4, 7 and 10 form a phase a, stator windings 2, 5, 8 and 11 form a phase b, and stator windings 3, 6, 9 and 12 form a phase c. In each phase a, b or c, the stator windings may be connected in parallel or series with each other. Thus, only one current control module M need be provided for the three phases a, b or c. Periodically varying currents are supplied to stator windings 1-12 of the three phases a, b and c via the current control module M in such a way as to have a phase separation of 120 degrees with respect to each other, thereby generating a rotating magnetic field close to a periphery of the rotor 101; thus, the rotor 101 is driven to rotate through the interaction of the permanent magnets with the rotating magnetic field.

It can be seen from the description above that each stator winding may be regarded as a resistor, which will generate heat as current flows therethrough. In the prior art, taking phase a as an example, the resistors embodied by each of the stator windings 1, 4, and 10 are connected in parallel with each other; thus, after a current enters phase a, each resistor will generate the same heat. Thus, it is not possible to separately adjust the heat dissipation amount of each stator winding.

FIGS. 3A and 3B show schematically a manner of arrangement of stator windings of an electric machine 200 according to an embodiment of the present application. FIG. 3A shows that the electric machine 200 has the same stator winding layout as the electric machine 100. For example, the electric machine 200 comprises a rotor 201, having eight permanent magnets 202 arranged thereon at uniform intervals in the circumferential direction. However, as FIGS. 3A and 3B further show, the manner in which the 12 stator windings 1-12 of the electric machine 200 are supplied with power in each phase is different from the electric machine 100. Specifically, in phase a, the four stator windings 1, 4, 7 and 10 can be supplied with power via independent current control modules M1, M2, M3 and M4 respectively; similarly, in phase b or c, the four stator windings 2, 5, 7 and 11 or 3, 6, 9 and 12 can also be supplied with power via the independent current control modules M1, M2, M3 and M4 respectively.

In FIG. 3B, the stator windings are divided into four subgroups: "1-2-3", "4-5-6", "7-8-9" and "10-11-12". Two adjacent subgroups differ by a circumferential angle of 90 degrees. Thus, all of the stator windings in each subgroup can be electrically connected to the same current control module, and be supplied with power under the control thereof. According to this embodiment of the present application, one or more temperature measurement devices are provided for each subgroup. For example, each temperature measurement device may comprise one or more temperature sensors. Taking subgroup 1-2-3 as an example, two temperature sensors 210 may be provided separately among the stator windings 1, 2 and 3, for the purpose of detecting the temperature of the subgroup 1-2-3 during operation of the electric machine 200. Preferably, the temperature sensors 210 may be disposed at an axial end of the stator windings. In addition, in an alternative embodiment, the temperature sensors 210 may also be disposed on the stator core (not shown) or on an inside wall or outside wall of the housing of the electric machine 200. Alternatively, one or more temperature sensors may even be provided for each stator winding.

Each current control module M1, M2, M3 or M4 then controls the size of a power supply current of each stator winding in the corresponding subgroup on the basis of a temperature measurement value of the subgroup provided therefor. For example, as the electric motorcycle is travelling, when the temperature of subgroup 1-2-3 is measured as being high, and in particular when the temperature of subgroup 1-2-3 is higher than a first preset value, the current control module M1 reduces the current supplied to stator windings 1, 2 and 3 in subgroup 1-2-3 when it is necessary to supply power, thereby correspondingly reducing the heat emitted by a region where subgroup 1-2-3 is located. As another example, as the electric motorcycle is travelling, when the temperature of subgroup 7-8-9 is measured as being low, in particular lower than a second preset value, then in order to compensate for a torque loss of the rotor 201 caused by reducing the power supply current to subgroup 1-2-3, the current control module M3 can increase the current supplied to stator windings 7, 8 and 9 in subgroup 7-8-9 when it is necessary to supply power. Those skilled in the art will understand that the first preset value may be set according to a maximum tolerable temperature value of the stator windings, e.g. may be greater than the maximum tolerable temperature value of the stator windings, or smaller than the maximum tolerable temperature value of the stator windings. The criterion for determining the second preset value is that the torque loss is so large as to necessitate compensation. For example, the first preset value may be equal to or greater than the second preset value.

Those skilled in the art will understand that each current control module may be connected to an electronic central control unit (or circuit board), in order to control the operation of each current control module.

Figure 4:
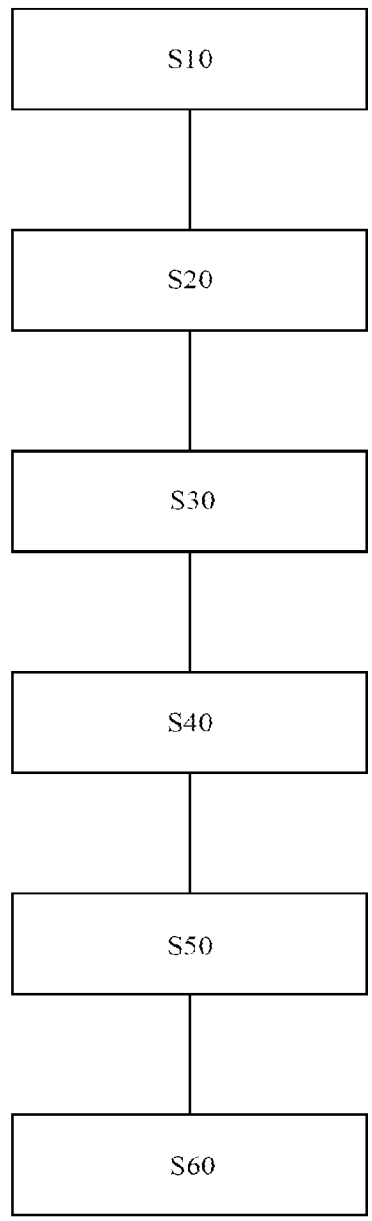
FIG. 4 shows schematically a flow chart of an electric machine control method according to an embodiment of the present application, corresponding to the embodiment in FIGS. 3A and 3B.

FIG. 4 shows schematically a flow chart of an electric machine control method according to an embodiment of the present application, corresponding to FIGS. 3A and 3B. Specifically, in step S10, an N-phase electric machine is provided, wherein N is an integer ≥3. The electric machine comprises a housing, i×N stator windings arranged in a fixed manner in the housing, and a rotatable rotor surrounded by the stator windings in the housing, wherein i is an integer ≥2. In step S20, the stator windings are consecutively divided into i subgroups in the circumferential direction, each subgroup having N stator windings. In the context of the present application, "consecutively divided" means that the i subgroups are immediately adjacent in succession in the circumferential direction, and the stator windings in each subgroup are also immediately adjacent in succession in the circumferential direction. In step S30, i current control modules M1, . . . , Mi are provided for the electric machine. In step S40, each current control module is correspondingly electrically connected to the N stator windings in one corresponding subgroup, so that when the stator windings in the i subgroups are supplied with power by means of the i current control modules, a rotating magnetic field is generated around the rotor. In step S50, i temperature measurement devices are provided for the electric machine, wherein each temperature measurement device is used for measuring the temperature of one corresponding subgroup in the i subgroups during operation of the electric machine. In step S60, based on a temperature measurement value of each subgroup during operation of the electric machine, a power supply amplitude of the stator windings in said subgroup is independently controlled by means of the corresponding current control module. For example, when the temperature measurement value of a $1^{st}$ temperature measurement device is higher than a predetermined critical value, a $1^{st}$ current control module M1 outputs a small current, in order to control a heating amount of a region where the corresponding stator windings are located. As another example, when the temperature measurement value of a $3^{rd}$ temperature measurement device is lower than a predetermined critical value, then in order to compensate for a rotor torque loss caused by the $1^{st}$ current control module M1 outputting a small current, a 3rd current control module M3 can output a large current, in order to correspondingly increase the magnetic field strength generated by the corresponding stator windings and thus increase the rotor torque. In the context of the present application, increasing or decreasing the power supply amplitude means changing the size of the amplitude of the varying current supplied.

Using the technical approach of the present application as described above, it is substantially possible to eliminate the problem caused by heat dissipation from the stator windings being uneven in the circumferential direction. However, the problem of uneven heat dissipation from the stator windings also exists in the axial direction of the electric machine, due to the blocking effect of the vehicle frame structure. To solve this problem, another embodiment of the present application is described below. FIGS. 5A, 5B, 5C, and 5D show schematically a manner of arrangement of stator windings of an electric machine 300 according to this embodiment of the present application.

Figure 5A:
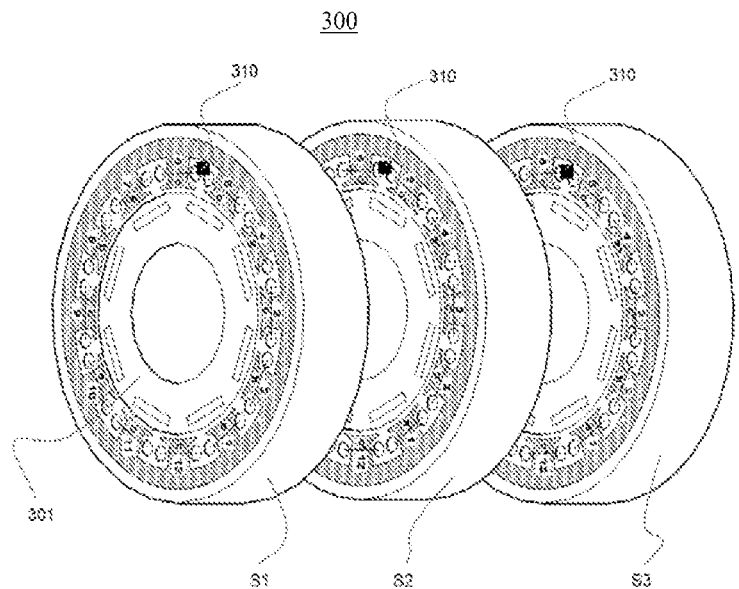
FIGS. 5A, 5B, 5C, and 5D show schematically a manner of arrangement of stator windings of an electric machine according to another embodiment of the present application.

According to this embodiment, the stator windings of the electric machine 300 are segmented in the axial direction. For example, as shown in FIG. 5A, the stator windings of the electric machine 300 are divided into 3 segments in the axial direction. For this purpose, the electric machine 300 may comprise a housing, with three stator winding segments S1, S2 and S3 installed in a fixed manner inside the housing, and a rotatable rotor 301 surrounded by the stator windings in the housing. In an alternative embodiment, the three stator winding segments S1, S2 and S3 may also each have independent housings, which can be fitted together to form the housing of the electric machine 300. The stator winding segments S1, S2 and S3 are independent of each other, and each stator winding segment for example comprises 12 stator windings 1, 2, 3, 4, 5, 6, 7, 8, 9, 10, 11 and 12 in the circumferential direction, each of these being metal wires which are wound at uniform intervals on a stator core (not shown). As further shown in FIGS. 5B, 5C, and 5D, for each stator winding segment S1, S2 or S3, the stator windings respectively form phases a, b and c; a', b' and c'; a", b" and c". In each phase, the stator windings may be connected in parallel or series with each other. To ensure uniformity of rotation of the magnetic fields generated, phases a, a' and a" are aligned with each other axially, phases b, b' and b" are aligned with each other axially, and phases c, c' and c" are aligned with each other axially.

Figures 5B, 5C, 5D:
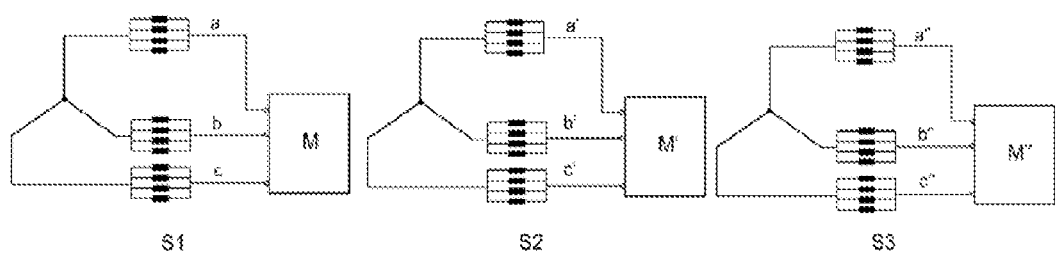

As shown in FIGS. 5B, 5C, and 5D, three current control modules M, M' and M" are provided for the three stator winding segments S1, S2 and S3, each current control module being used to control the power supplied to all stator windings in the corresponding stator winding segment. That is to say, for one stator winding segment S1, periodically varying currents are supplied to the stator windings of the three phases a, b and c in a phased manner by means of the current control module M. Thus, the three stator winding segments are energized simultaneously, such that a rotating magnetic field is generated close to a periphery of the rotor 301, and the rotor 301 is driven to rotate through the interaction of the permanent magnets with the rotating magnetic field.

A temperature measurement device 310 is provided for each stator winding segment S1, S2 or S3. For example, the temperature measurement device 310 may comprise a temperature sensor, for independently detecting the temperature of the stator winding segment S1, S2 or S3 during operation of the electric machine 300. Preferably, the temperature measurement device 310 may be disposed at an axial end of the stator windings. In addition, in an alternative embodiment, the temperature measurement device 310 may also be disposed on the stator core (not shown) or on an inside wall or outside wall of the housing of the electric machine 300. Alternatively, one or more temperature sensors may even be provided for each stator winding in the stator winding segments.

The current control modules M, M' and M" may operate independently of each other. Thus, each current control module may control the size of a power supply current of each stator winding on the basis of a temperature measurement value of the stator winding segment where it is located. For example, when the temperature of stator winding segment S1 is measured as being high, in particular when the temperature is higher than a first preset value, the current control module M of stator winding segment S1 can reduce the amplitude of current supplied to each stator winding when each phase a, b or c needs to be supplied with power, and can thereby correspondingly reduce the heat emitted by the region where stator winding segment S1 is located. As another example, when the temperature of stator winding segment S2 is measured as being low, in particular lower than a second preset value, then in order to compensate for a torque loss of the rotor 301 caused by reducing the power supply current to stator winding segment S1, the current control module M' can increase the amplitude of current supplied to each stator winding when each phase a', b' or c' needs to be supplied with power.

Figure 6:
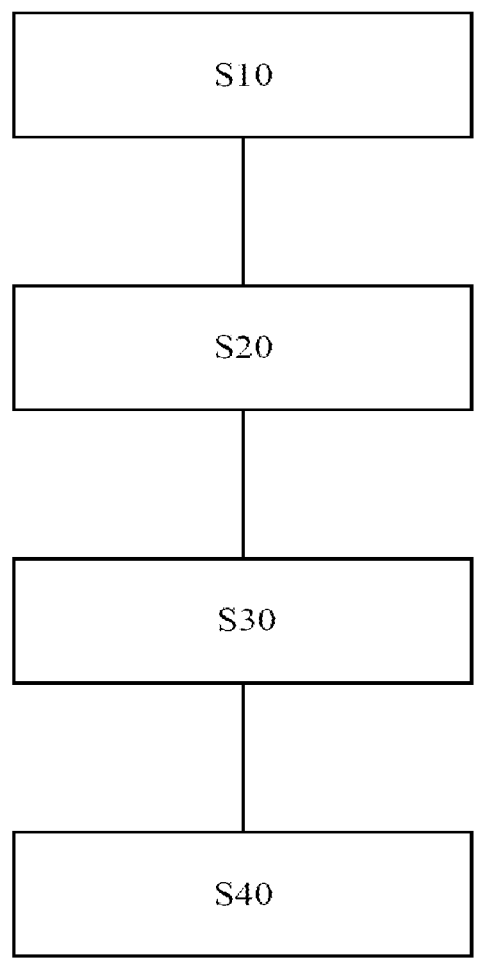
FIG. 6 shows schematically a flow chart of an electric machine control method according to an embodiment of the present application, corresponding to the embodiment in FIGS. 5A, 5B, 5C, and 5D.

FIG. 6 shows schematically a flow chart of an electric machine control method according to an embodiment of the present application, corresponding to FIGS. 5A, 5B, 5C, and 5D. Specifically, in step S10, an N-phase electric machine is provided, wherein N is an integer ≥3, the electric machine comprising a housing, K stator winding segments arranged in a fixed manner in the axial direction in the housing, and a rotatable rotor surrounded by the stator windings in the housing, wherein K is an integer ≥2, each stator winding segment comprising multiple stator windings. In step S20, N current control modules are provided for each stator winding segment. In step S30, K first temperature measurement devices are provided for the electric machine, each first temperature measurement device being used to measure the temperature of one corresponding stator winding segment in the K stator winding segments during operation of the electric machine. In step S40, based on a temperature measurement value of each stator winding segment during operation of the electric machine, a power supply amplitude of the stator windings in said stator winding segment is independently determined. Preferably, each stator winding segment comprises the same number of multiple stator windings, and the stator windings of the stator winding segments are respectively aligned with each other in the axial direction.

Using the technical approach of the present application as described above, it is substantially possible to eliminate the problem caused by heat dissipation from the stator windings being uneven in the axial direction. In addition, those skilled in the art should understand that the embodiments shown in FIGS. 3A and 3B and FIGS. 5A, 5B, 5C, and 5D may be used in combination. For example, in an alternative embodiment, for any stator winding segment of the electric machine 300 in the embodiment shown in FIGS. 5A, 5B, 5C, and 5D, mutually independent current control modules may be provided and temperature measurement devices distributed in the circumferential direction may be provided in the manner shown in FIGS. 3A and 3B (or the method embodiment shown in FIG. 4), and it is thereby possible to independently control the power supply amplitudes of the stator windings in the circumferential direction according to temperature measurement values for said stator winding segment, in order to eliminate the problem caused by heat dissipation from the stator windings in said stator winding segment being uneven in the circumferential direction. For example, at least one of the K stator winding segments comprises i×N stator windings, so that the stator windings are consecutively divided into i subgroups in the circumferential direction, each subgroup having N stator windings, wherein i is an integer ≥2; furthermore, i current control modules and i second temperature measurement devices are provided for said stator winding segment, each current control module being correspondingly electrically connected to the N stator windings in one corresponding subgroup, so that when the stator windings in the i subgroups are supplied with power by means of the i current control modules, a rotating magnetic field is generated around the rotor, and each temperature measurement device is used for measuring the temperature of one corresponding subgroup in the i subgroups during operation of the electric machine.

Those skilled in the art will understand that the embodiments described herein may be combined with each other at will; and the method steps described may be deleted or added or may have their order adjusted as required. Although specific embodiments of the present application have been described in detail here, these have been given merely for explanatory purposes, and should not be regarded as limiting the scope of the present application. Furthermore, those skilled in the art will understand that the embodiments described herein may be used in combination with each other. Various substitutions, changes and alterations may be conceived on condition that the spirit and scope of the present application are not departed from.

The invention claimed is:

1. An N-phase electric machine, wherein N is an integer ≥3, the electric machine comprising:
   a housing;
   i×N stator windings arranged in a fixed manner in the housing, wherein i is an integer ≥2;
   a rotatable rotor surrounded by the i×N stator windings in the housing, wherein the stator windings are consecutively divided into i subgroups in a circumferential direction, each subgroup having N stator windings;
   i current control modules; and
   i temperature measurement devices,
   wherein each current control module is correspondingly electrically connected to the N stator windings in one corresponding subgroup, so that when the stator windings in the i subgroups are supplied with power by the i current control modules, a rotating magnetic field is generated around the rotor,
   wherein each temperature measurement device is configured to measure a temperature measurement value of one corresponding subgroup in the i subgroups during operation of the electric machine; and
   wherein based on the temperature measurement value of the corresponding subgroup, each current control module is configured to independently control a power supply amplitude of the stator windings in the subgroup during operation of the electric machine.

2. The N-phase electric machine as claimed in claim 1, wherein each temperature measurement device comprises one or more temperature sensors disposed in the housing.

3. The N-phase electric machine as claimed in claim 2, wherein each temperature sensor of the one or more temperature sensors is disposed at an axial end of the stator winding.

4. The N-phase electric machine as claimed in claim 1, wherein:
   when the temperature measurement value of one subgroup is higher than a first preset value, the power supply amplitude of the stator windings in the subgroup is reduced by the corresponding current control module; and/or
   when the temperature measurement value of one subgroup is lower than a second preset value, the power supply amplitude of the stator windings in the subgroup is increased by the corresponding current control module.

5. The N-phase electric machine as claimed in claim 3, wherein each temperature measurement device comprises N of the one or more temperature sensors, to measure the temperature of each stator winding in the corresponding subgroup.

6. The N-phase electric machine as claimed in claim 4, wherein the first preset value is equal to or greater than the second preset value.

7. An N-phase electric machine, wherein N is an integer ≥3, the electric machine comprising:
   a housing;
   K stator winding segments arranged in a fixed manner in an axial direction in the housing, wherein K is an integer ≥2;
   a rotatable rotor surrounded by the K stator winding segments in the housing, each stator winding segment comprising multiple stator windings;
   K temperature measurement devices, each temperature measurement device configured to measure a temperature measurement value of one corresponding stator winding segment in the K stator winding segments during operation of the electric machine, wherein a power supply amplitude of the stator windings in each stator winding segment is independently set according to the temperature measurement value of the stator winding segment during operation of the electric machine.

8. The N-phase electric machine as claimed in claim 7, wherein each stator winding segment comprises the same number of multiple stator windings, and the stator windings of the stator winding segments are respectively aligned with each other in the axial direction.

9. The N-phase electric machine as claimed in claim 7, wherein:
    each temperature measurement device comprises one or more temperature sensors disposed in the housing, and each temperature sensor is disposed at an axial end of the stator winding.

10. The N-phase electric machine as claimed in claim 7, wherein:
    a current control module is provided for each stator winding segment, and when the temperature measurement value of one stator winding segment is higher than a first preset value, the power supply amplitude of the stator windings in the stator winding segment is reduced by the corresponding current control module; and/or when the temperature measurement value of one stator winding segment is lower than a second preset value, the power supply amplitude of the stator windings in the stator winding segment is increased by the corresponding current control module, and
    the first preset value is equal to or greater than the second preset value.

11. The N-phase electric machine as claimed in claim 7, further comprising:
    K stator winding segments arranged in a fixed manner in an axial direction in the housing, wherein K is an integer ≥2 and at least one of the K stator winding segments comprises i×N stator windings, so that the stator windings are consecutively divided into i subgroups in a circumferential direction, each subgroup having N stator windings, wherein i is an integer ≥2;
    i current control modules operably connected to the at least one stator winding segment; and
    i temperature measurement devices operably connected to the at least one stator winding segment,
    wherein each current control module is correspondingly electrically connected to the N stator windings in one corresponding subgroup, so that when the stator windings in the i subgroups are supplied with power by the i current control modules, a rotating magnetic field is generated around the rotor, and
    wherein each temperature measurement device is used for measuring the temperature of one corresponding subgroup in the i subgroups during operation of the electric machine; and
    wherein based on a temperature measurement value of the corresponding subgroup, each current control module independently controls a power supply amplitude of the stator windings in the said subgroup during operation of the electric machine.

12. The N-phase electric machine as claimed in claim 1, wherein the electric machine is included in an electric motorcycle.

13. A method for controlling an N-phase electric machine, wherein N is an integer ≥3, the electric machine comprising K stator winding segments arranged in a fixed manner in an axial direction, wherein K is an integer ≥2, each stator winding segment comprising multiple stator windings, the method comprising:
    providing K temperature measurement devices for the electric machine, and measuring a temperature measurement value of each corresponding stator winding segment in the K stator winding segments during operation of the electric machine; and
    based on a temperature measurement value of each stator winding segment, independently determining a power supply amplitude of the stator windings in the stator winding segment during operation of the electric machine.

14. The control method as claimed in claim 13 wherein the electric machine comprises i×N stator windings, and i is an integer ≥2, the method further comprising:
    consecutively dividing the stator windings into i subgroups in a circumferential direction, each subgroup having N stator windings;
    providing i current control modules and i temperature measurement devices for the electric machine, each current control module being correspondingly electrically connected to the N stator windings in one corresponding subgroup, so that when the stator windings in the i subgroups are supplied with power by the i current control modules, a rotating magnetic field is generated around a rotor of the electric machine, and each temperature measurement device is used for measuring the temperature of one corresponding subgroup in the i subgroups during operation of the electric machine; and
    based on a temperature measurement value of each subgroup, independently controlling a power supply amplitude of the stator windings in the subgroup using the corresponding current control module during operation of the electric machine.

15. The control method as claimed in claim 14, further comprising:
    when the temperature measurement value of one subgroup is higher than a first preset value, reducing the power supply amplitude of the stator windings in the subgroup using the corresponding current control module; and/or
    when the temperature measurement value of one subgroup is lower than a second preset value, increasing the power supply amplitude of the stator windings in the subgroup using the corresponding current control module.

16. The control method as claimed in claim 13, wherein each stator winding segment comprises the same number of multiple stator windings, and the stator windings of the stator winding segments are respectively aligned with each other in the axial direction.

17. The control method as claimed in claim 13, wherein a current control module is provided for each stator winding segment, and the method further comprises:
    when the temperature measurement value of one stator winding segment is higher than a first preset value, reducing the power supply amplitude of the stator windings in the stator winding segment using the corresponding current control module; and/or
    when the temperature measurement value of one stator winding segment is lower than a second preset value, increasing the power supply amplitude of the stator windings in the stator winding segment using the corresponding current control module.

18. The control method as claimed in claim 13, wherein each temperature measurement device comprises one or more temperature sensors disposed in the housing.

19. The control method as claimed in claim 18, wherein the temperature sensor is disposed at an axial end of the stator winding.

20. The control method as claimed in claim 17, wherein the first preset value is equal to or greater than the second preset value.

* * * * *